(12) United States Patent
Roy et al.

(10) Patent No.: US 11,148,112 B2
(45) Date of Patent: Oct. 19, 2021

(54) LIQUID DISTRIBUTORS FOR MONOLITH CATALYSTS AND SUBSTRATES

(71) Applicant: INDIAN INSTITUTE OF TECHNOLOGY, DELHI, New Delhi (IN)

(72) Inventors: Shantanu Roy, New Delhi (IN); Deepali Chugh, New Delhi (IN)

(73) Assignee: INDIAN INSTITUTE OF TECHNOLOGY, DELHI, New Delhi (IN)

(*) Notice: Subject to any disclaimer, the term of this patent is extended or adjusted under 35 U.S.C. 154(b) by 0 days.

(21) Appl. No.: 16/628,791

(22) PCT Filed: Jun. 27, 2018

(86) PCT No.: PCT/IB2018/054741
§ 371 (c)(1),
(2) Date: Jan. 6, 2020

(87) PCT Pub. No.: WO2019/008474
PCT Pub. Date: Jan. 10, 2019

(65) Prior Publication Data
US 2020/0197899 A1    Jun. 25, 2020

(30) Foreign Application Priority Data
Jul. 6, 2017    (IN) .............................. 201711023863

(51) Int. Cl.
*B01J 4/00*    (2006.01)
*B01J 19/24*    (2006.01)
(Continued)

(52) U.S. Cl.
CPC ............. *B01J 4/002* (2013.01); *B01J 16/005* (2013.01); *B01J 19/2485* (2013.01); *B01J 19/32* (2013.01);
(Continued)

(58) Field of Classification Search
CPC . B01J 19/2485; B01J 19/32; B01J 4/00; B01J 4/002; B01J 4/004; B01J 4/005;
(Continued)

(56) References Cited

U.S. PATENT DOCUMENTS 3,598,541 A * 8/1971 Hennemuth ......... C10G 49/002
422/607
4,126,539 A * 11/1978 Derr, Jr. ................. B01J 8/0492
208/108

(Continued)

FOREIGN PATENT DOCUMENTS

CN    1891333 A    1/2007
EP    1049531 B1    11/2005

*Primary Examiner* — Lessanework Seifu
(74) *Attorney, Agent, or Firm* — Volpe Koenig

(57) ABSTRACT

The present invention relates to different liquid distributors for monolith in multiphase applications. The present invention more particularly relates to distributor devices in the form of a single injection and multiple injection pipe distributors; shower head distributor comprising a plurality of holes for plunging liquid; a packing of spherical particles with a pre-distributor to split the liquid into manifold streams, before entry into the monolith bed. The present invention provides liquid distributors for monolith in multiphase applications providing improved liquid distribution into the monolith bed resulting in uniform fluid flow in each channel so as to make maximum use of the catalyst surface area.

3 Claims, 11 Drawing Sheets

(51) Int. Cl.
  *B01J 16/00* (2006.01)
  *B01J 19/32* (2006.01)
(52) U.S. Cl.
  CPC .. *B01J 2219/185* (2013.01); *B01J 2219/2419* (2013.01); *B01J 2219/3322* (2013.01)
(58) Field of Classification Search
  CPC .......... B01J 2219/185; B01J 2219/2413; B01J 2219/3322
  See application file for complete search history.

(56) References Cited

U.S. PATENT DOCUMENTS

| | | |
|---|---|---|
| 7,032,894 B2 | 6/2006 | Adusei et al. |
| 2014/0183275 A1 | 7/2014 | Parimi et al. |

* cited by examiner

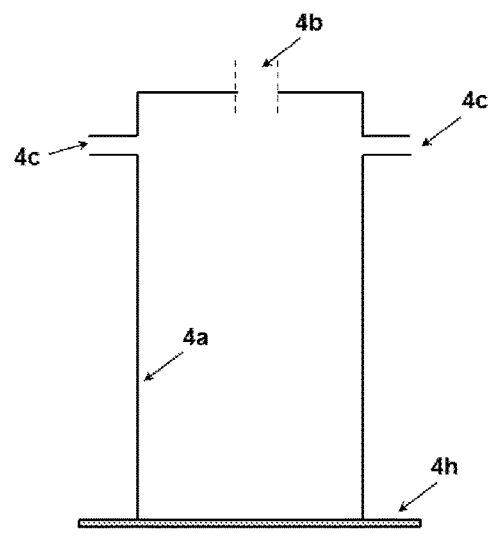
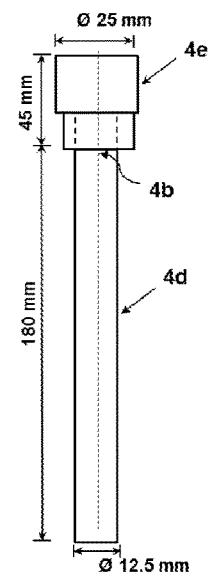
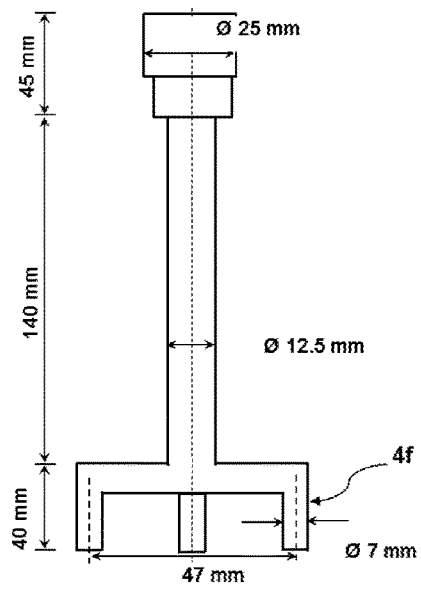
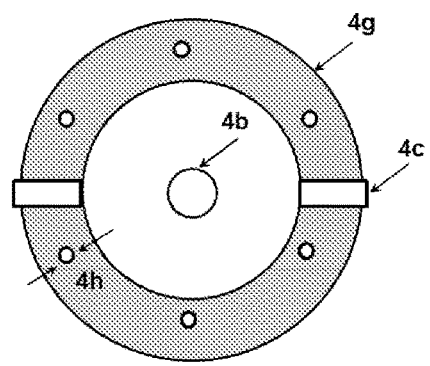
FIG. 4.1　　　　　FIG. 4.2　　　　　FIG. 4.3

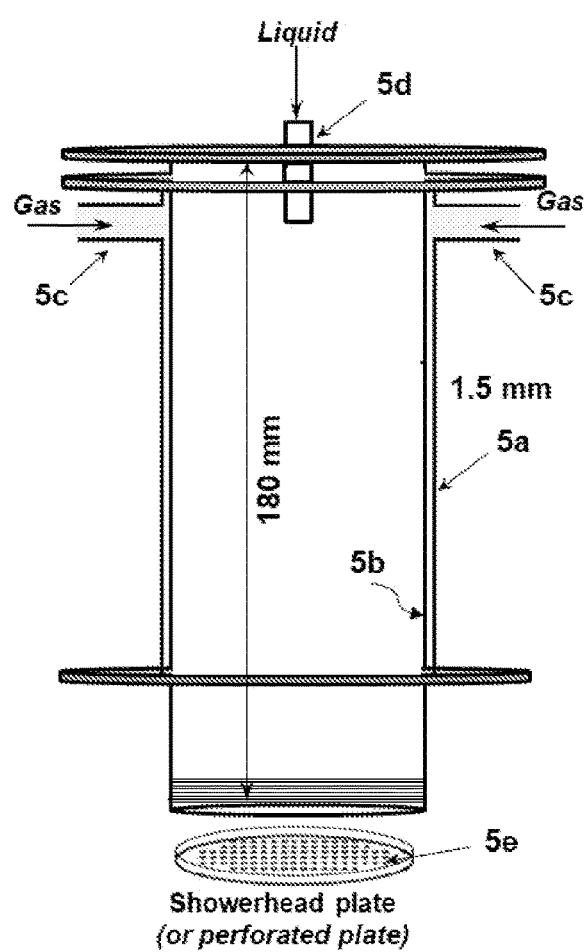
FIG. 5.1
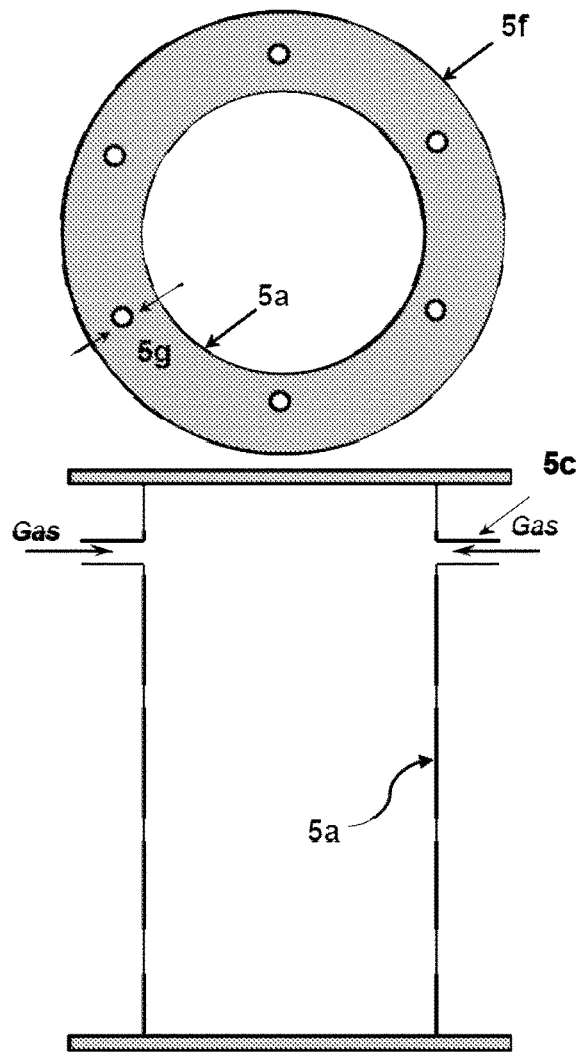
FIG. 5.2

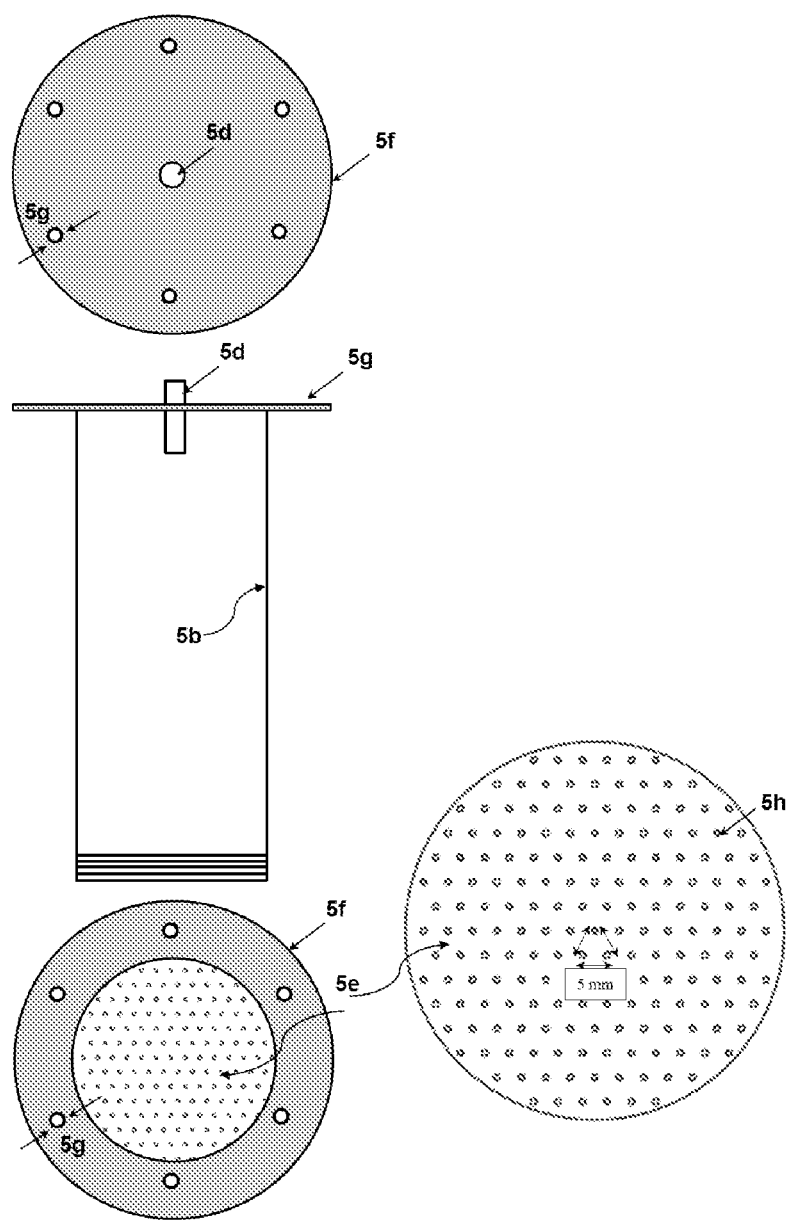
FIG. 5.3

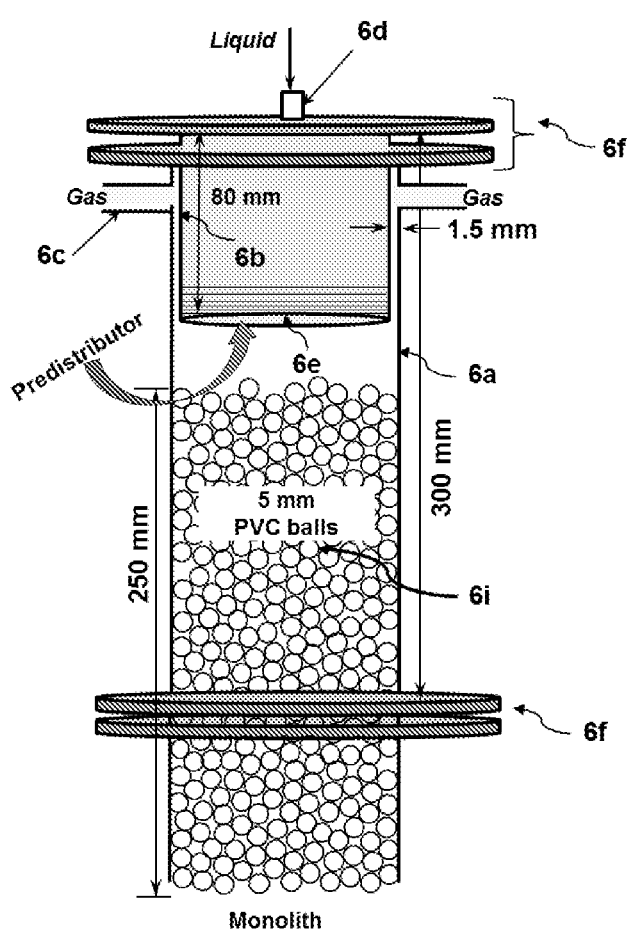
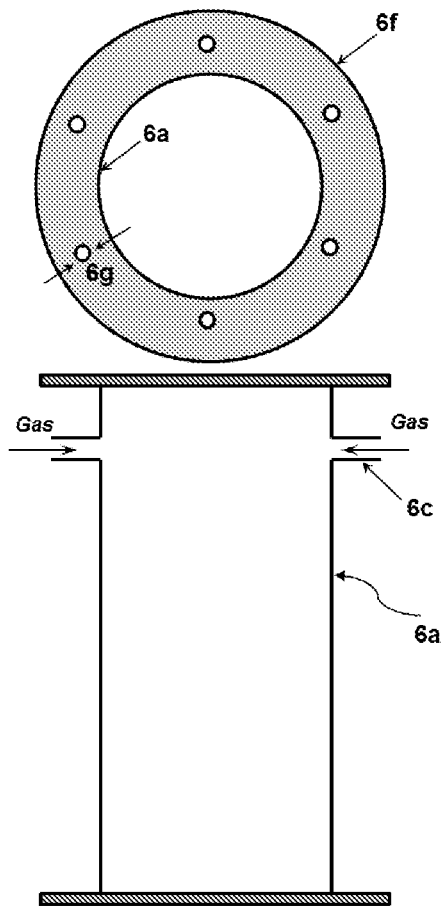
FIG. 6.1
FIG. 6.2

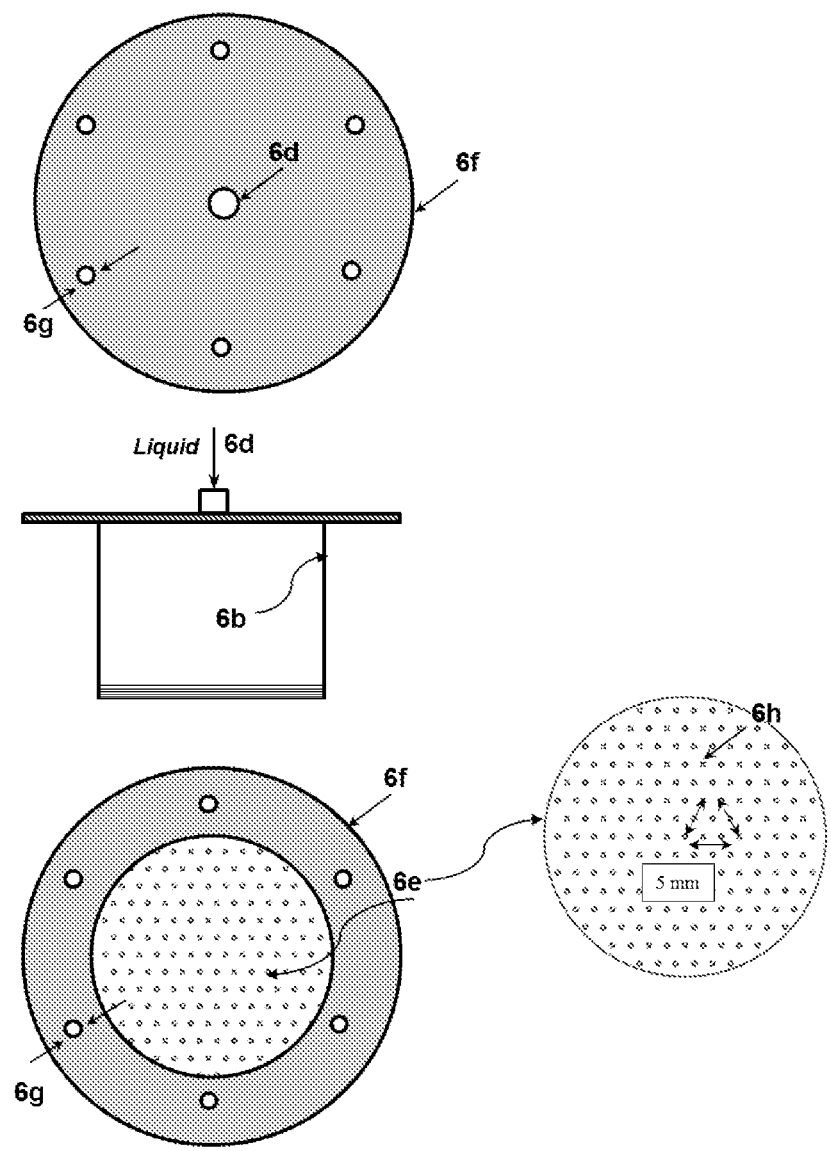
FIG. 6.3

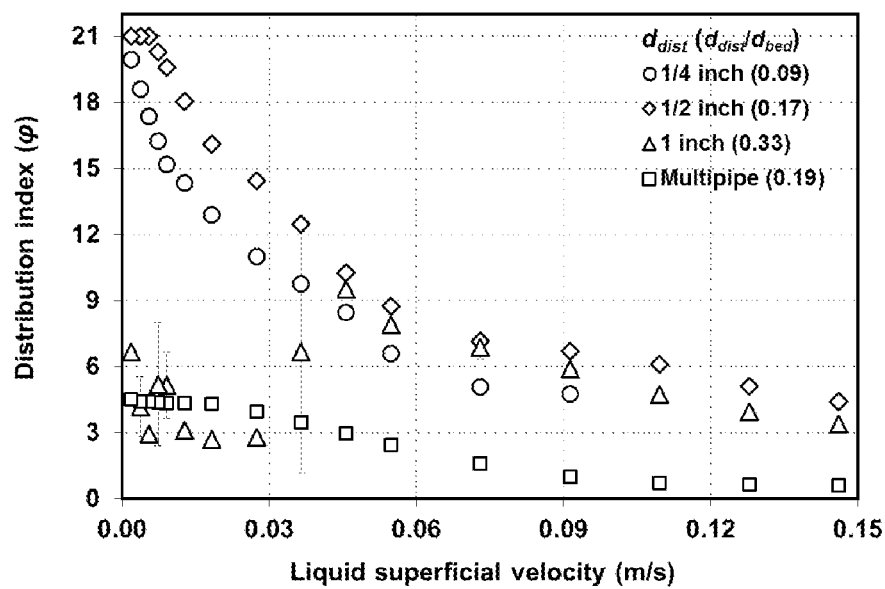
FIG. 7.1
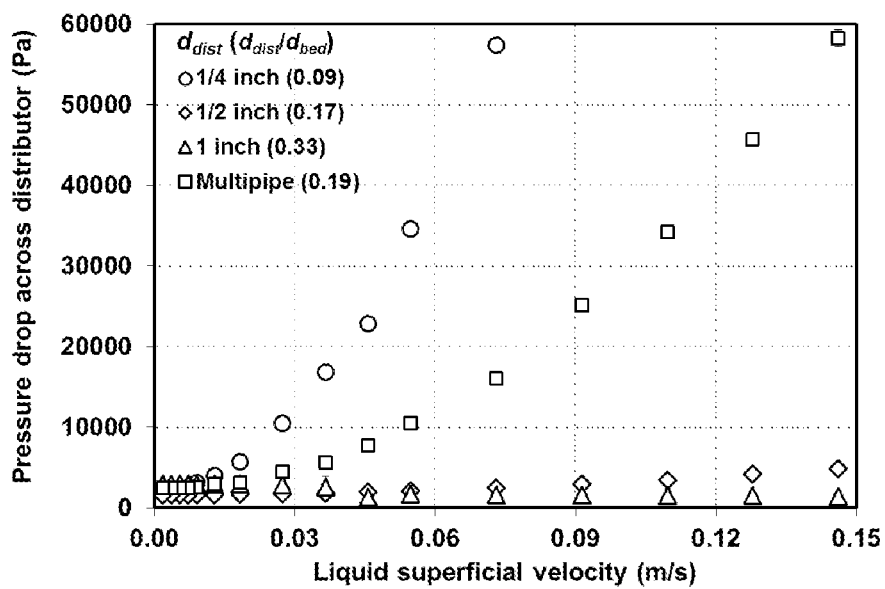
FIG. 7.2

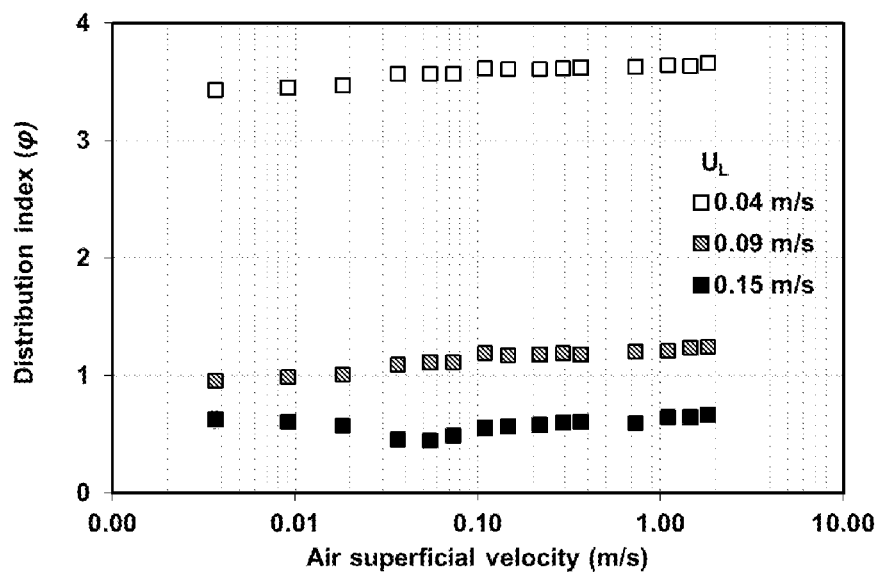
FIG. 7.3
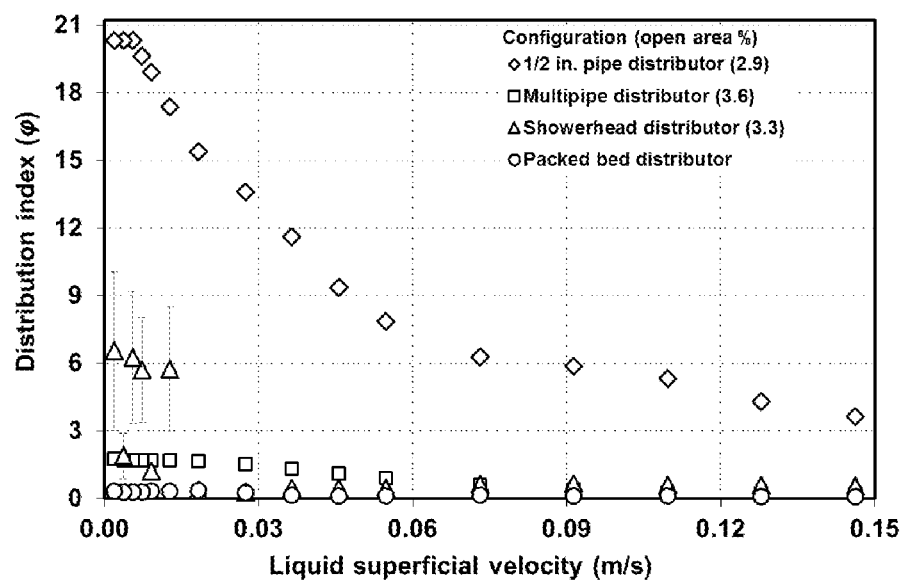
FIG. 8.1

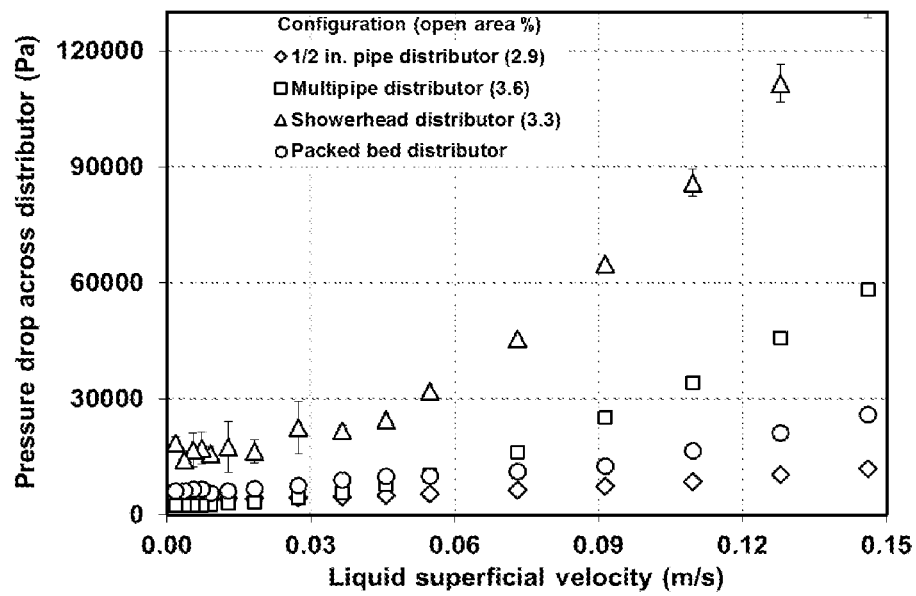
FIG. 8.2
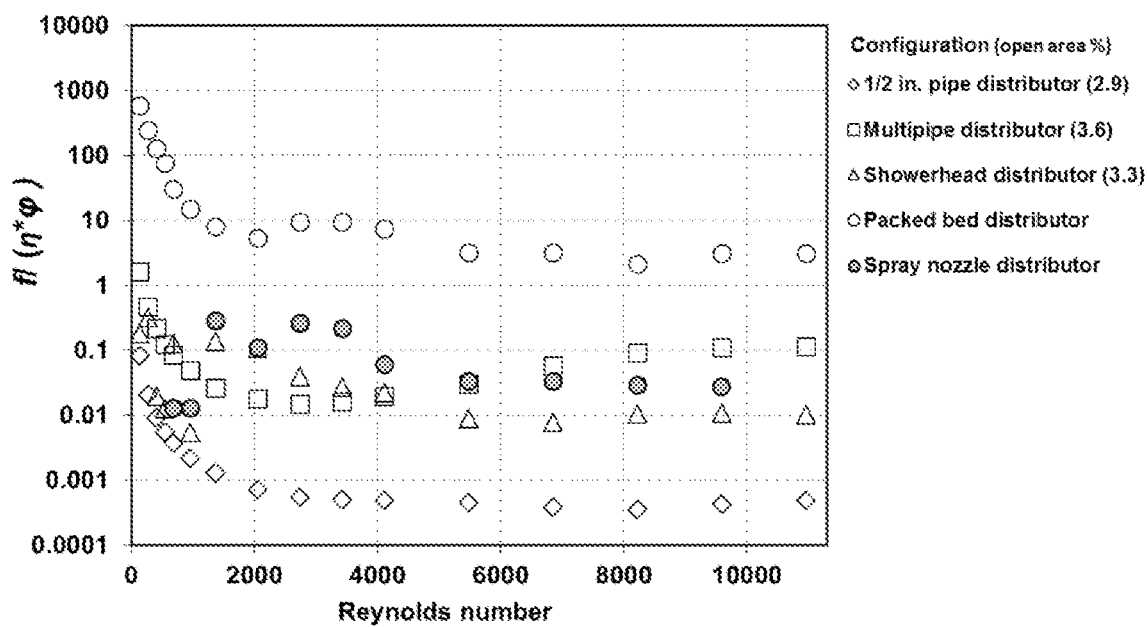
FIG. 9

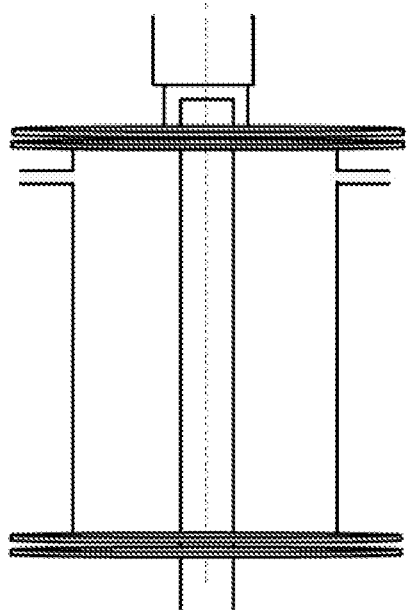
FIG 10.1
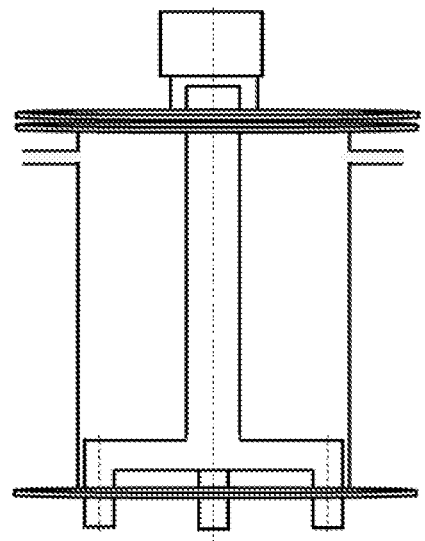
FIG 10.2
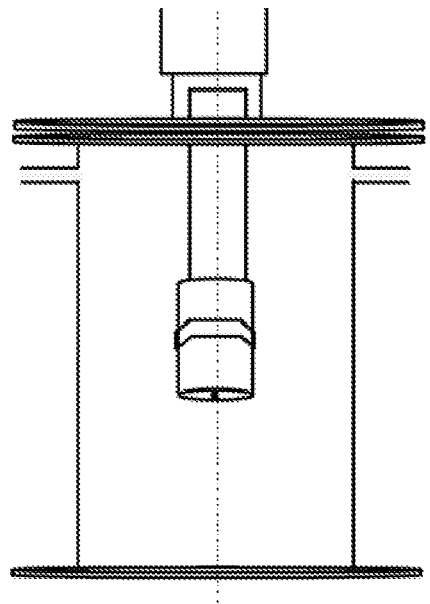
FIG 10.3
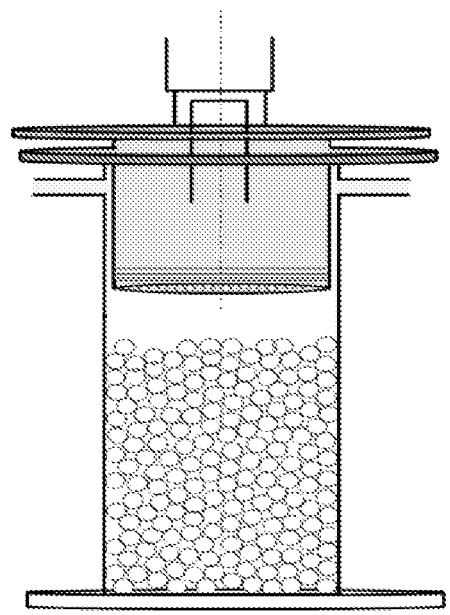
FIG 10.4

LIQUID DISTRIBUTORS FOR MONOLITH CATALYSTS AND SUBSTRATES

CROSS REFERENCE TO RELATED APPLICATIONS

This application is a 35 USC § 371 national stage of PCT/IB2018/054741, which was filed Jun. 27, 2018, is entitled "LIQUID DISTRIBUTORS FOR MONOLITH CATALYSTS AND SUBSTRATES," and claims priority to Indian Application No. 201711023863, filed on Jul. 6, 2017, both of which are incorporated herein by reference as if fully set forth.

FIELD OF INVENTION

The present invention relates to the flow distribution specifically for the application of monolith catalyst substrates to the field of multiphase reactors. More particularly, the invention relates to distributor devices in the form of a single injection and multiple injection pipe distributors; shower head distributor comprising a plurality of holes for plunging liquid; a packing of spherical particles with a pre-distributor to split the liquid into manifold streams, before entry into the monolith bed.

BACKGROUND OF THE INVENTION

Monolith reactors consisting of several straight, distinct, parallel channels are a potential catalyst substrate for three-phase catalytic reactions, which are conventionally performed in trickle bed reactors. Schematic representation of a monolith block is shown in FIG. 1, where $d_H$ denotes hydraulic diameter of a channel and $t_W$ denotes the wall thickness. The catalyst substrate is either extruded directly as the channel walls of the monolith or the channel walls may be made of a relatively impervious material (like cordierite), and be coated with a thin layer of catalytic material (such as gamma alumina with impregnated metals).

Owing to its multichannel structure, the performance of monolith reactor is significantly affected by the fluid inlet distributor for multiphase applications. The fluid distribution indirectly influences the catalyst utilization, which in turn affects the overall performance and throughput of monolith reactor. It is therefore critically important to have uniform fluid flow in each channel so as to make maximum use of the catalyst surface area. In the literature, advantages of monoliths have been everywhere claimed under the assumption of uniform inlet distribution, which is almost impossible to achieve in practice. Thus, it is the endeavor of this disclosure to approximate to the maximum extent the ideality of uniform distribution.

It has to be noted that low pressure drop is one of the underlined advantages of the monolith in contrary to trickle beds and therefore is to be taken care of while considering a distributor design intended for industrial practice. Given the reported benefits, monoliths have been proposed for various applications such as hydrotreating, hydrogenation.

Industrial operations of monoliths for large scale applications like hydroprocessing would mean "packing" the reactor with monolith catalyst. One way of packing would be to fabricate the monolith in the "shape" of the reactor bed. Another way would be to "pack" the large reactor with monolith blocks of a given (typically regular) shape, such as square blocks or hexagonal blocks, as shown in FIG. 2. In the second possibility (more likely), any gas-liquid distributor whose efficacy is demonstrated on one block can simply be "multiplied" on top of each of the blocks: thus, multiplicity of blocks would amount to multiplicative scale-up of the distributor devices.

Another possibilty of use of monolith blocks would be as a single monolith block itself to serve as a mini reactor (or a "Short Modular Reactor" or "Small Modular Reactor" or SMR) for a multiphase application, with typical sizes being in the range of about 10-100 cm diameter, and at most a couple of meters long. Recently, monoliths in the form of 'mm-scale multifunctional reactors' have been considered very promising in pharmaceutical industries at a scale of commercial interest. Moreover, with paradigm shifting towards clean fuels, such as Dimethyl ether (DME) is seen as the fuel of future, small scale (modular) monoliths are potential candidates to produce onboard fuel of desired sulfur slip specification to avoid large upfront investments. Many other applications of monolith SMR are possible, all of which will require effective gas-liquid distribution as an essential feature.

Commercially available distributors designed for trickle beds have very low drip point densities and are unsuitable for monolith structures. This is due to lack of interconnectivity between the distinct monolith channels which does not allow for any radial movement of fluid down the length of the reactor.

U.S. Pat. No. 7,032,894B2 discloses a fluid distributor device utilizing the plurality of monolithic channels. The device consists of a stack of monoliths arranged in order of decreasing hydraulic diameter to divide the incoming fluid into multiple streams before entering the monolith bed.

U.S. Publication 2014/0183275A1 discloses a fluid distributor for monolith comprising a plurality of nozzles to distribute the mixed fluid over the top of monolith bed. However, in neither of the patents is there any quantification of the efficacy of these designs in terms of the distribution quality and the pressure drop through the distributors. Also, the earlier design has not been known to be scalable to larger sizes of monoliths.

The present inventors have surprisingly arrived at improved distributor devices which are possible only with quantification through the design metric. This allows to characterize the flow distribution relative to the perfectly uniform flow as well as provides a relative measure of performance amongst the distributors also. A comparison of flow distribution is presented with a purpose of selection of distributor as per industrial suitability and need. The present invention is scalable to larger sizes of monoliths.

The present inventors have found distributor devices in the form of a single injection and multiple injection pipe distributors; viz., a showerhead distributor comprising a plurality of holes for plunging liquid; a packing of spherical particles with a pre-distributor to split the liquid into manifold streams before entry into the monolith bed. The distributor devices of the present invention provide improved fluid distribution and therefore have uniform fluid flow in each channel so as to make maximum use of the catalyst surface area. Detailed list of advantages is below.

Some of the salient features/advantages of the present invention, considered to be noteworthy are mentioned below:

A design metric has been defined for quality assessment of flow distribution taking into account the radial influence of distribution (Eqn. 1) and measure the ability of different distributor configurations for monolith on a single scale. The inclusion of radial weighting function specifically allows the consideration of the contribution with respect to the central point of distributor assembly in the total quality. Besides, the factor is intended to optimize the liquid dripping system in terms of their density and spatial location in the (distributor) assembly to get desired distribution quality.

The invention is vis-à-vis disclosing an axial pipe distributing liquid over monolith surface in form of a single dripping nozzle; or as multiple dripper with multiple outlet nozzles over monolith surface; wherein the sum of flow area through multiple nozzles is equivalent to the flow area of the incoming feed pipe (or inlet nozzle) to avoid maldistribution. Alternatively, a multi-feed dripping pipe with a net flow area different from the single pipe is also covered.

Another configuration discussed provides flow distribution wherein liquid distribution is through multiple dripping streams discharging from the openings punched in a detachable bottom plate of the liquid vessel; gas entry is through side nozzles.

The complete arrangement of flow distribution assembly comprising the positioning of gas entry nozzles at side; perforated plate followed by a packed bed for liquid dripping and multiplying while moving downstream; a mesh with a slight inside fold in peripheral boundary over monolithic channels to avoid plugging of monolithic channels by packing medium (to fully utilize the liquid streams coming as output from the packing), is disclosed.

A figure of merit is defined considering the friction factor, allowing to ponder the contribution of distribution quality and pressure drop across distributor together, targeting towards an optimal distributor configuration (Eqn. 2). The metric is intended as a performability measure of a distributor device in view of its industrial application.

Objects of the Invention

It is an object of the present invention to provide distributor devices in the form of a single injection and multiple injection pipe distributors; showerhead distributor comprising a plurality of holes for plunging liquid; a packing of spherical particles with a pre-distributor to split the liquid into manifold streams, before entry into the monolith bed.

It is another object of the present invention to provide liquid distributors for monolith in multiphase applications providing improved liquid distribution into the monolith bed.

It is another object of the present invention to provide liquid distributor devices having improved fluid distribution resulting in uniform fluid flow in each channel so as to make maximum use of the catalyst surface area.

SUMMARY OF THE INVENTION

According to an aspect of the present invention there is provided a device for distributing a liquid flow stream downwardly into a monolith bed, comprising:
a. An enclosed vessel (4a) comprising inlet port (4b) to hold an inlet feed axial pipe (4d) through a connector (4e) at centre position in vessel (4a) to feed liquid;
b. two side inlet ports (4c) at the top peripheral of the vessel (4a) for gas phase entry;
c. output of inlet feed pipe (4d) for recovering liquid either through single drip (single pipe distributor) or the said output transforming into multiple nozzles (4f) downstream symmetrically spaced to distribute liquid in a uniform fashion across the cross section of monolith;
d. sufficient space of 0.1 to 0.6 times the bed diameter interposed in between nozzle's exit and monolith surface wherein liquid and gas communicate before entering the monolith bed.

According to another aspect of the present invention there is provided a showerhead distributor device for distribution of liquids comprising:
a. An inner enclosed vessel (5b) comprising centered inlet port (5d) to feed liquid;
b. Perforated plate (5e) attached to said vessel (5b) at the bottom;
c. An outer vessel (5a) housing said enclosed vessel (5b) and having side inlet ports (5c) for gas phase entry; characterised by narrow space in between outer vessel (5a) and inner vessel (5b) for gas flow;
d. sufficient distance between the perforated plate (5a) and the monolith surface wherein liquid and gas communicate before entering the monolith bed.

According to another aspect of the present invention there is provided a packed bed distributor device for distribution of liquid comprising:
a. An inner enclosed vessel (6b) comprising centered inlet port (6d) to feed liquid;
b. Perforated plate (6e) attached to said vessel (6b) at the bottom;
c. An outer vessel (6a) housing said enclosed vessel (6b) and having side inlet ports (6c) for gas phase entry; characterised by narrow space in between outer vessel (6a) and inner vessel (6b) for gas flow;
d. Packed bed (6i) placed on monolith bed for distribution of liquid over monolith bed.
e. sufficient distance between the perforated plate (6e) and the packed bed (6i) wherein liquid and gas communicate before entering the monolith bed.

BRIEF DESCRIPTION OF THE ACCOMPANYING DRAWINGS

The above and other aspects, features and advantages of certain exemplary embodiments of the present invention will be more apparent from the following description taken in conjunction with the accompanying drawings in which.

Figure 1:
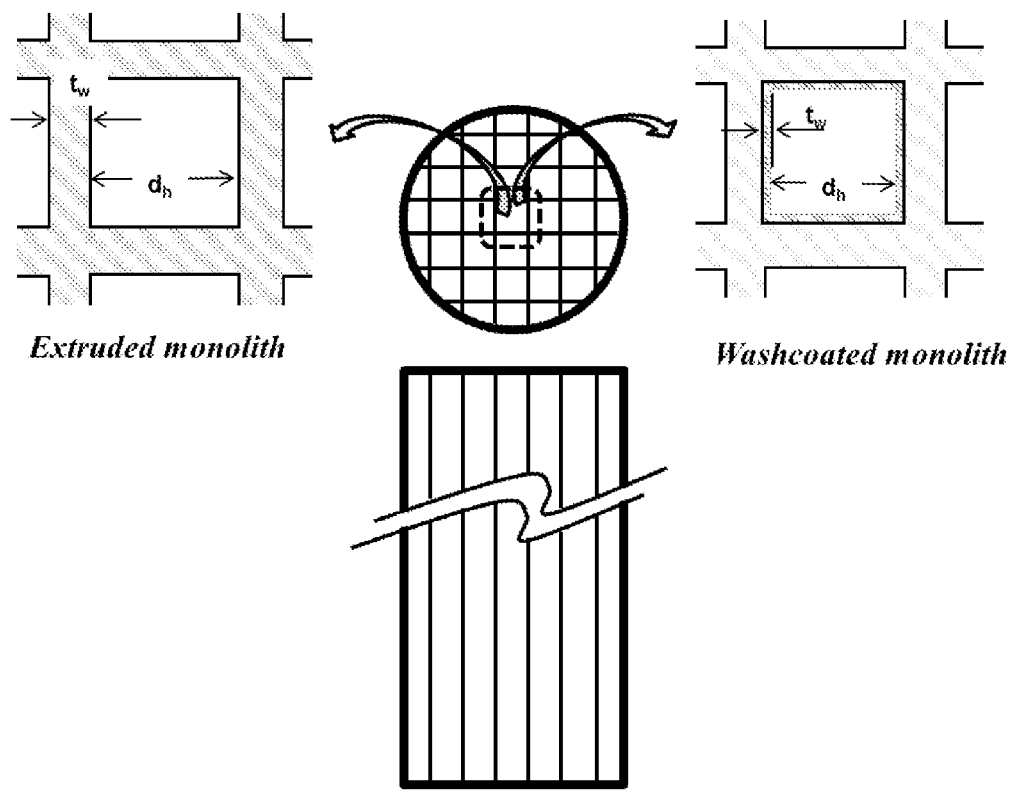
FIG. 1 illustrates a schematic of a monolith block representing an extruded monolith and a washcoated monolith.
Figure 2:
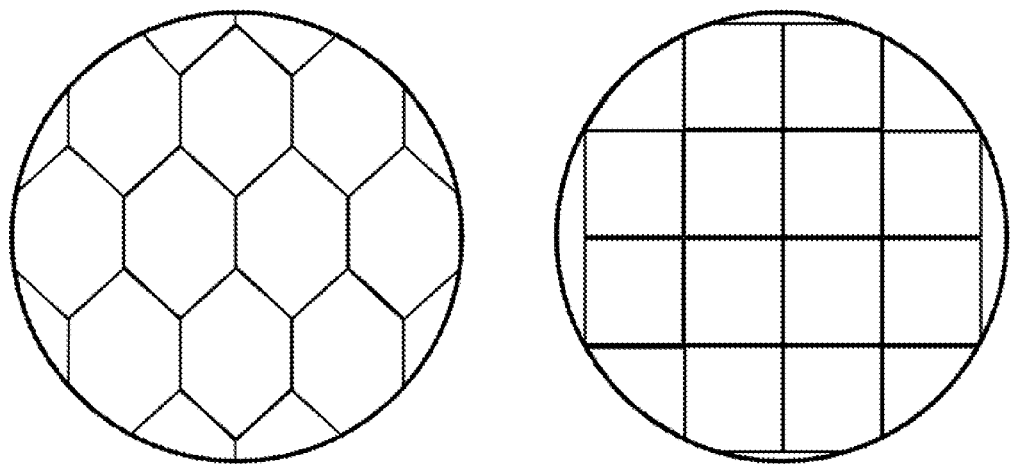
FIG. 2 illustrates a schematic illustration of possible monolith block arrangements for a large scale (monolith) reactor.

FIG. 4.1 illustrates a Representative design of the pipe distributor casing unit.

FIG. 4.2 illustrates a Representative design of single injection pipe distributor.

FIG. 4.3 illustrates a Representative design of multi-injection pipe distributor unit.

FIG. 5.1 illustrates a Representative design for shower head distribution unit.

FIG. 5.2 illustrates a Representative design of outer casing.

FIG. 5.3 illustrates a Representative design of inner casing with a perforated plate.

FIG. 6.1 illustrates a Representative design of packed bed distributor unit

FIG. 6.2 illustrates a Representative design of outer casing of the packed bed distributor FIG. 6.3 illustrates a Representative design of inner casing of the packed bed distributor unit and the perforated plate FIG. 7.1 illustrates a Effect of flow conditions on Distribution Index.

FIG. 7.2 illustrates a Pressure drop corresponding to the Distribution index (obtained in FIG. 7.1) at different flow conditions for pipe distributors.

FIG. 7.3 illustrates an Effect of superficial air velocity on Distribution Index w.r.t liquid superficial velocities as stated for ½" diameter single (injection) pipe distributor.

FIG. 8.1 illustrates an Effect of liquid flow conditions on Distribution Index.

FIG. 8.2 illustrates Pressure drop across distributor device corresponding to Distribution indices obtained by different distributor configurations in FIG. 8.1.

FIG. 9 illustrates merit (f/ηφ) for different distributor configurations at zero gas flow conditions.

FIG. 10.1 illustrates a single injection distributor device.
FIG. 10.2 illustrates a multi-injection distributor device.
FIG. 10.3 illustrates a shower head distributor device.
FIG. 10.4 illustrates a packed bed distributor device.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures. All dimensions in the figures are approximate.

DETAILED DESCRIPTION OF THE INVENTION

The following description with reference to the accompanying drawings is provided to assist in a comprehensive understanding of exemplary embodiments of the invention. It includes various specific details to assist in that understanding but these are to be regarded as merely exemplary.

Accordingly, those of ordinary skill in the art will recognize that various changes and modifications of the embodiments described herein can be made without departing from the scope of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the scope of the invention as defined by the appended claims and their equivalents.

It is to be understood that the singular forms "a," "an," and "the" include plural referents unless the context clearly dictates otherwise.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, steps or components but does not preclude the presence or addition of one or more other features, steps, components or groups thereof.

The present invention relates to different liquid distributors for monolith in multiphase applications. The present invention more particularly relates to distributor devices in the form of a single injection and multiple injection pipe distributors; shower head distributor comprising a plurality of holes for plunging liquid; a packing of spherical particles with a pre-distributor to split the liquid into manifold streams, before entry into the monolith bed.

In an embodiment of the present invention, there is provided a liquid distributor device comprising flow of liquid through a single axial pipe with its center coinciding with that of the monolithic block to spread and distribute the liquid in channels of that single block; the device is scalable to large scale monolithic reactors (consisting of several blocks), wherein same pipe successively splits into multiple nozzles with decreasing dimensions to distribute liquid over the monolith cross section. The distance between the top surface of monolith and distributor is kept sufficient to provide enough space for gas-liquid intermixing where gas phase nozzles may be provided in the outer casing.

In another embodiment of the present invention, there is provided a device to distribute liquid over monolith cross section. It comprises a vessel with a detachable (and replaceable) plate having several openings through which the liquid flows and plunges over monolith cross section. The size of the openings and flow conditions regulates the depth of liquid inside the vessel and therefore controls the flow of liquid through the monolith block(s) in the vessel. Gas phase inlet nozzles are located in the outer casing concentric with the inner vessel. An adequate distance is kept in between the (perforated) plate comprising openings and the top of monolith surface for gas-liquid intermixing before entering the monolith channels.

In another embodiment of the present invention, there is provided a method to modify and improve the above distributor device by placing a bed of inert spherical balls at the top of monolith surface to further breakdown the incoming liquid into thin rivulets and increase the spread over the monolith cross section. The distance separating the showerhead and top of the packed bed is kept sufficient for gas-liquid intermixing.

For the purpose of the present invention, a comparative analysis is carried out by the fluid distributors of the present invention by conducting experiments to assess liquid distribution with simultaneous pressure drop measurements across the distributor device under identical process condition. The results are shown in FIGS. 7.1-7.3, 8.1, 8.2 and 9.

Most importantly, in the present invention the choice of the fluid distributor is made on the basis of its applicability and the compensating pressure drop in operation.

Figure 3:
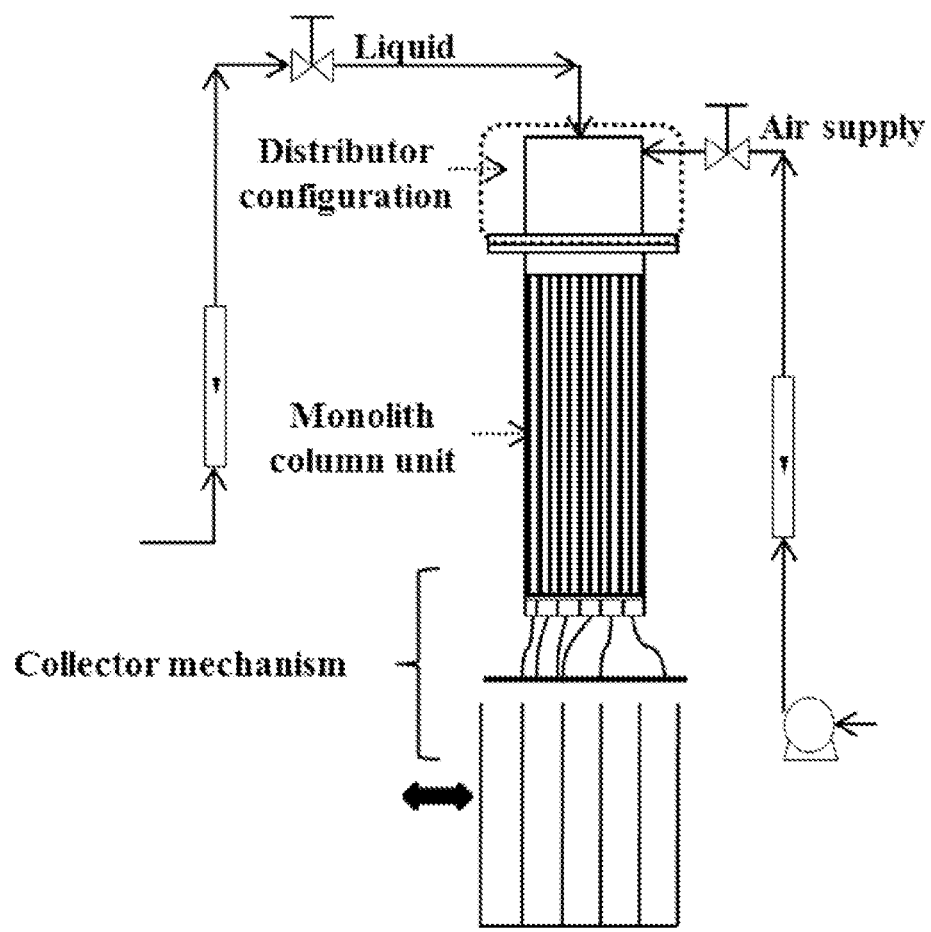
FIG. 3 illustrates an Outline of experimental setup.

The present invention provides devices for the fluid distribution in monolith reactors. The liquid phase and gaseous phase are to be fed over monolith in the form of a single injection; multi-injection or through several drip points using these devices, and subsequently move the monolith blocks in a co-current fashion. The outline of a monolith reactor setup is shown in FIG. 3 wherein a distributor section is positioned above monolith column. In an alternative configuration, the two phases may flow counter currently, viz., the liquid flows down the vertically aligned monolith in with gravity, while the gas flows up due to buoyancy (counter-current configuration) and this designs can be very well used for counter current flow operations.

The combination of distribution required and pressure drop permissibility for an application will allow the selection of the distributor unit. The schematics of all the units are shown in FIGS. 4-6.

With reference to the drawings, FIG. 4.1 illustrates the vessel (4a) having inlet ports for both liquid (4b) and gas (4c). An axial pipe (4d) held through a connector (4e) over the monolith cross section is used to distribute liquid radially over monolith bed. The pipe is shown in FIG. 4.2 is positioned at a central position in the vessel (4a). The hydraulic diameter of the pipe (4d) can be of any size, as suitable for the monolith considering fluid properties and flow conditions. The ratio of the diameter of the pipe distributor with the diameter of bed ($d_{dist}/d_{bed}$) is a variable within 0.04 to 0.4. In the present invention, a typical value of $d_{dist}/d_{bed} \approx 0.17$ was found to offer an appropriate distribution without excessive pressure drop. The positioning of the distributor is function of its diameter and so has to be located at an appropriate distance from the monolith surface to have a good radial spread. Gas phase is introduced through two side entries (4c) as marked in the vessel (4a). An improved version of this single (injection) pipe distributor is shown in FIG. 4.3. The output of inlet feed pipe (4d) splits into multiple drip nozzles to distribute the feed over the entire surface of monolith bed. Herein, the feed pipe (4d) is divided into four nozzles (4f) symmetrically arranged over the cross section with an angle of 90° in between and the nozzle dimension decreases by a factor of 0.56. This way, the flow slows down as it proceeds towards monolith surface. The radial stretch of four nozzle arms with respect to axial bend length is kept to be 1.1($\approx$47/40). The arms of the feed pipe can also be radially stretched in a gradual way to reduce the pressure loss. Flange (4g) attached at the bottom to the vessel (4a) is used to join it to the column holding monolith downstream by bolting (in holes (4h)). It is important to mention here that liquid distribution across monolith is better, in this case, owing to increased number of liquid drip points, but at the expense of the pressure exerted on the flow system.

FIG. 5.1 shows the schematic of showerhead distributor. Liquid feed enters to the vessel (5b) from the top through an inlet port (5d). This inlet pipe through the port can be of arbitrary diameter with the purpose to direct liquid into the vessel (5b). A perforated plate (5e) is attached to the bottom of the vessel (5b) to deliver the liquid over the monolith cross section through the perforations (or openings) (5h) punched on the plate as shown in FIG. 5.3. The perforations are preferably made of round shape, but any other shape can also be employed. The number of perforations or openings can be arbitrary and of any size, as per the flow conditions and fluid to be used. They are normally uniformly spaced to enhance distribution although their density and size can be varied over the cross section also to improve the distribution further. The total perforated or open area is defined as a percentage of monolith bed area varies within 2-15% and is dependent on the number and size of perforations (typically, 0.5 to 3 mm). The variables are to be optimized to get a fair liquid distribution over monolith bed avoiding the excess pressure drop as required by the application and flow conditions. The plate is detachable and attached to the inner vessel (5b) through a threaded connection. This provides the flexibility to clean up the plate in case of choking/fouling of perforations.

Liquid floods the vessel (5b) to a certain level and flows through the holes in the plate by gravity over monolith bed. The illustrative perforated plate shown in FIG. 5.3 consists of 181 perforations (diameter=1 mm) i.e. drip density of 25 per inch square, placed over the cross section with 5 mm pitch in a triangular arrangement. All this unit is enclosed in an outer casing (5a) (i.e. outer vessel) with a slightly larger diameter than inner vessel (5b) to provide sufficient space for gas flow as shown in FIG. 5.2. The gaseous phase enters through two side entries (5c) in the outervessel (5a) and flows down to the annulus area between the two vessels (5a, 5b). Flanges (5f) as attached are used to join both the vessels (5a, 5b) to each other by bolting (in holes (5g)). The above discussed unit is sealed onto the monolith bed keeping sufficient distance between the top of monolith bed and perforated plate to promote liquid gas interaction.

FIG. 6.1 shows the schematic of a packed bed distributor. This consists of two concentric vessels (6a, 6b), where gas phase enters through two side nozzles (6c) provided in the outer vessel. An inlet pipe port (6d) provided at the top in the vessel (6b) is used to feed liquid in the inner vessel with a perforated plate (6e) attached to the bottom to deliver the liquid further. As shown in FIG. 6.1, a packing of inert balls (6i) is placed upon monolith bed with a mesh positioned in between, for distributing liquid over monolith with a peripheral fold to place it somewhat above monolith column. The size of balls is sufficiently big to avoid plugging of monolith channel openings and is ~1 to 5 times the hydraulic diameter of the monolithic channel, but not too big which may lead to the bulk of liquid preferring a flow path at the wall. The height of packing bed keeping the aspect ratio (L/D) of ~3 as suggested by literature for packed beds to have a uniform distribution, which can be otherwise varied upto 5. This is done with a purpose to increase the liquid drip coming through perforated plate (6e), and to further split into multiple streams while going down the packed bed length. In addition, it also provides some additional residence time for liquid and gas phases to interact before they enter monolithic channels. Herein, the perforated plate is an additional element that acts as a predistributor to direct liquid over the packed bed and aids in getting an improved liquid distribution. Therefore, as typical dimensions, the length of inner vessel (6b) is relatively small and approximately 0.3 times the packed bed height. The number of perforations (or openings) (6h) (FIG. 6.3) can be arbitrary and of any size as per the flow conditions; fluid to be used; pressure drop acceptability in the system. Herein, the pre-distributor perforated plate has 7.55% perforation area. Liquid swamps in the inner vessel (6b) and flows down through the perforations by gravity over the packing (FIG. 6.3). Gas entry paths (6c) are connected to the inner vessel (6a) shown in FIG. 6.2. A sufficient distance is provided in between the bottom of the inner vessel (6a) and top of the packed height for liquid and gas phase to get mix before entering the packed bed. These are typical dimensions of an embodiment; different dimensioning may be done depending on the diameter of the monolith block. Also, instead of spherical balls, some other packing material can be used in the configuration along with some other distributor as a substitute to pre-distributor. The distributor units are sealed on to the monolith to have leak-proof joints through bolting (6g) the flanges (6f) shown in FIG. 6.3.

Referring to the distributor units presented in FIGS. 4-6, cold flow experiments are conducted in monolith bed to illustrate the effect of distributor units. The experiments are performed at ambient conditions using setup (based on liquid collection technique) inspired by Behl and Roy [M. Behl, S. Roy, Experimental investigation of gas-liquid distribution in monolith reactors, Chem. Eng. Sci. 2007, 62, 7463-7470] shown in FIG. 3; with a monolith of diameter 0.076 m, a length of 0.305 m and of 200/12 part (OFA=69%, GSA=1849 m²/m³, hydraulic diameter of 1.5 mm and wall thickness of 0.3 mm). The setup was operated in the co-current down flow mode using water as liquid phase and air as the gas phase. Gravimetric liquid collecting technique is used to measure the distribution over the cross section of monolith bed. The entire (bottom) cross section of monolith bed is divided into pre-defined zones facilitating the measurement of time-averaged liquid mass flux in all of them separately which tells about the distribution of liquid over the cross section of the monolith.

To assess the distribution of different units on an equivalent basis, a distribution index, is defined, which describes the extent of deviation from a homogeneous distribution that exists. For a uniform flow, it has a value of zero and the increased values indicate the deviation from uniformity. Indeed, it is desirable to have distribution index as small as possible for a distributor unit to attain uniformity in the flow.

$$\varphi = \frac{1}{(M-1)\overline{W}^2}\sum_{i=1}^{M}\left(1-\frac{\sqrt{x_i^2+y_i^2}}{R}\right)(W_i-\overline{W})^2 \quad (1)$$

Where $W_i$ the mass flow is rate through zone i, $\overline{W}$ is the mean of mass flow rates through all zones and M is the number of zones. To effectively examine the distribution in the entire area, a weight corresponding to the Euclidean distance between the centre of each collection zone and the radius of the vessel is used $$\left(1-\frac{\sqrt{x_i^2+y_i^2}}{R}\right),$$

where $\sqrt{x_i^2+y_i^2}$ represents the distance of the zone i from the centre of cross section under focus and R is the total radius of that particular cross-sectional area.

It was found through experimental results that the index was largely dependent on the type of distributor and the flow conditions. The results of different pipe distributor configurations have been presented in FIG. 7.1 with respect to their diameter ($d_{dist}$) and their ratio with a diameter of bed($d_{dist}/d_{bed}$). It is important to mention here that distribution index ($\varphi$) is significantly decreased in the multi nozzle (four) in contrast to single pipe (FIG. 7.2), owing to higher number of liquid drip points at the expense of pressure drop as shown in FIG. 7.2. The percentage decrease varies depending on the flow conditions. The purpose of FIG. 7.3 is to show the n eligible effect of air flow velocity on distribution index ($\varphi$). On the basis of this, the experiments planned to assess a distributor design configuration are done using liquid flow only.

FIGS. 8.1 and 8.2 illustrates the distribution index and pressure drop for the different configurations of approximately same open or perforated area percentage (ratio of area available for liquid flow in a distributor unit to the area of the monolith bed*100). Higher the number of drip points, lower the distribution index is obtained indicating better liquid distribution but at a penalty of higher pressure loss as indicated by FIG. 8.2. Pressure drop obtained for different distributor designs is used to compute friction factor (f). Hence, to assess the suitability of a distributor design, the figure of merit is defined to show the combined effect of distributor performance and power consumed by the distributor.

$$FOM = \left(\frac{f}{\eta * \varphi}\right) \quad (2)$$

Where η is a factor that indicates the uniformity of flow distribution regarding the maximum difference of all the (zonal) flow quantities. It exhibits worst-case scenario of flow distribution for a particular design unit as following $$\eta = \left(\frac{W_{i,max}-W_{i,min}}{\overline{W}}\right) \quad (3)$$

$W_{i, max}$=maximum of all the mass flow rates $W_i$ of flow distribution $W_{i, min}$=minimum of all the mass flow rates $W_i$ of flow distribution $\overline{W}$=mean of all the mass flow rates $W_i$ of flow distribution FIG. 9 shows the comparison among proposed distributor design units using the above-defined parameter. To assess the know-how on the designs, spray nozzle, a much widely used distributor is included in the figure. However, it is interesting to observe the superior performance of the packed bed distributor. This is attributed to its structure allowing the liquid to spread radially while going downstream the packing length. Distribution quality offered by the packed bed at low pressure drop makes it outperform spray nozzle which takes significant liquid side pressure drop to attain high quality distribution and is also susceptible to fouling due to its small orifice. Although single (injection) pipe distributor is lowermost as per figure of merit but the same transformed into an equivalent multi (injection) pipe design is certainly better. Its large diameter nozzles also make them less sensitive towards choking/fouling over the above two configurations. Indeed, showerhead design emerges as a better design at low flow rates in spite of high pressure drop because of small perforations. This can be successfully used with a filtering system in services to avoid choking of the perforations.

The present inventions were constructed in order to provide different ways to distribute liquid over monolith to approximate to the maximum extent of distribution. The designs are intended for industrial practice and are scalable to larger size applications in addition to small scale. There are presented with quantification of their distribution quality. Probably, the distributor whose efficacy is demonstrated on one block can simply be "multiplied" on top of each of the blocks. This would amount to multiplicative scale-up of the distributor device over multiplicity of blocks.

The present invention provides different devices that allow fluids to be distributed into a monolith bed. The units have been discussed with respect to different flow conditions and pressure drop measurements across distributor units which is the most important for any distributor to realize in practice. A comparison and evaluation has been done on the basis of the following four designs (embodiment) of the present invention.

I. Single (Injection) and Multi (Injection) Pipe Distributors:

A distributor device comprising:

1. An enclosed unit with provision of an inlet port to hold an axial pipe at centre position to feed liquid; two side nozzles at the top peripheral of the vessel for gas phase entry; though a variable ratio of the pipe diameter with monolith bed diameter lying within 0.04-0.4 approximately to have a broad spread of liquid distribution without excessive pressure drop; the output for recovering is either through single drip (single pipe distributor) or the same transforming into multiple nozzles downstream; a number of nozzles symmetrically spaced to distribute liquid in a uniform fashion across the cross section of monolith located beneath it while exerting a practicable pressure differential across the device; a sufficient space of 0.1 to 0.6 times the bed diameter is interposed in between nozzle's exit and monolith where liquid and gas communicate before entering the monolith bed.
2. Size of multiple nozzles for liquid exit (1/number of nozzles) in combination with its positioning should be sufficient to cover the monolith surface; wherein each nozzle is of sufficient size capable of handling viscous fluids and equivalent to inlet liquid feed pipe.
3. The multi (injection) distributor emerged to provide distribution approximately n i.e. number of non-overlapping injection nozzle times better the distribution obtained by the feed pipe as distributor at the penalty of pressure differential exerted using transformation of feed pipe into multiple nozzles of reduced dimensions.

II. Showerhead Distributor:

A device for distribution of reactants (liquid) comprising:

1. A cylindrical body of sufficient height with a centered inlet port for admitting liquid with a perforated plate attached at its bottom. The perforated plate has a number of perforations symmetrically arranged as the liquid exit openings; wherein liquid is introduced in cocurrent downward flow on to the surface of monolith through the perforations, as means of distribution over the whole cross section of monolith. An outer concentric casing housing the above unit having side inlet ports for gas; characterised by narrow space in between the two cylindrical casings for air flow; a sufficient distance between the perforated plate and the monolith surface is kept for liquid and gas to interact before entering the monolith bed.
2. The perforated plate as aforesaid, wherein the liquid introduced through a central inlet port is extended to the perforations punched on the perforated plate; the percent open (or perforation) area, function of number and size of perforations or openings is varied in between 2% to 15% of the monolith column area with opening size varying within range of 0.5 mm to 3 mm; the area of exit opening of liquid distribution acts as a mean to control the distribution at lower flow range, with said distribution adjustment compromising the pressure drop of distributor.
3. The showerhead distributor, considering different percent open area at selected conditions in turn produces similar distribution on the monolith at wide flow range in addition to being capable of controlling the distribution at lower flow range via size of exit openings of liquid.
4. The inner casing, wherein comprising a perforated plate attached at its bottom is joined with the said housing through bolting joints and therefore is separable to remove or replace perforated plate for cleaning purpose.

III. Packed Bed Distributor:

A device for distributing a fluid mixture (liquid) comprising:

1. An inner cylindrical chamber of sufficient height with a pivoted inlet port for admitting liquid and a perforated plate at bottom wherein a number of liquid exit openings are symmetrically arranged for gravitationally downward direction of liquid flow; a concentric cylindrical chamber housing the above unit with two side entry nozzles protruding air inside the distributor; considering in between the two said chambers is the narrow space for air flow; a randomly packed layer of inert particles accommodated in the said housing, further disperse the fluid radially across the layer with a mesh beneath to avoid plugging and guiding the fluid mixture into the monolith; characterised by sufficient space in between the pre-distributor and particulate layer allowing the fluids to mix prior to entering the particulate layer.
2. The packed bed may comprise existence of multiple size configurations of different packing heights within same packing to direct liquid downward.
3. The height of packed bed dividing the in feed into outlet streams is proportioned so as to reduce preferential path flow and can be varied upto 5 times the column diameter.
4. The particulate (packing) layer is configured with an inert packing of sufficient size in comparison to hydraulic diameter ($d_{packing}/d_H$) of monolithic channels; the stated aspect ratio be varied otherwise in the range of 1 to 5.

The mesh positioned below said packing wherein the mesh comprises pores of sizes equivalent to or bigger than the size of downstream monolithic channels possess a small peripheral fold.
5. The packed bed distributor device, wherein the said inner chamber comprising liquid exit openings are of size equivalent to the hydraulic diameter of channels or may be bigger avoiding choking acts as a predistributor; being separable from the said housing thereof accessible for occasional cleaning.
6. The packed bed distributor device is capable of producing relatively better and uniform distribution even at lower flow range, unlike other distributors.

APPLICATION OF THE PRESENT INVENTION

Though there is no commercial application of monoliths in multiphase field as yet, but they have been proposed for various industrial applications such as hydrotreating, hydrogenation (Kreutzer et. al, 2005; Liu et. al., 2005; Tsoligkas et. al., 2007; Natividad et. al., 2004). For such large scale applications, gas-liquid distributor whose efficacy is demonstrated on one block can simply be "multiplied" on top of each of the blocks: thus multiplicity of blocks would amount to multiplicative scale-up of the distributor devices.

Recently, monoliths in the form of 'mm-scale multifunctional reactors' have been considered very promising in pharmaceutical industries at a scale of commercial interest [F. Al. Badran, S. Awdry, S. T. Kolaczkowski, Development of a continuous flow reactor for pharmaceuticals using catalytic monoliths: Pt/C selective oxidation of benzyl alcohol, Catal. Today. 2013, 216, 229-239]. Therefore another possibilty envisioned is as a single monolith block itself to serve as a mini reactor (or a "Short Modular Reactor" or SMR) for a multiphase application. Moreover, with paradigm shifting towards clean fuels where DME (dimethyl ether) is seen as the fuel of future, small scale (modular) monoliths are potential candidates to produce on board fuel of desired sulfur slip specification to avoid large upfront investments. Many other applications of monolith SMR are possible, all of which will require effective gas-liquid distribution as an essential feature.

The invention claimed is:

1. A device for distributing a liquid flow stream downwardly into a monolith bed having a monolith surface, comprising:
   a. an enclosed vessel comprising inlet port to hold an inlet feed axial pipe through a connector at centre position in vessel to feed liquid;
   b. two side inlet ports at the top peripheral of the vessel for gas phase entry;
   c. an output of inlet feed pipe for recovering liquid either through single drip (single pipe distributor) or the said output transforming into multiple nozzles having nozzle exits downstream symmetrically spaced to distribute liquid in a uniform fashion across the cross section of monolith; and
   d. sufficient space of 0.1 to 0.6 times the bed diameter interposed in between the nozzle exits and the monolith surface wherein liquid and gas communicate before entering the monolith bed.

2. The device as claimed in claim 1, wherein the ratio of the diameter of the pipe distributor with the diameter of bed ($d_{dist}/d_{bed}$) is a variable within 0.04 to 0.4.

3. The device as claimed in claim 2, wherein the value of $d_{dist}/d_{bed} \approx 0.17$ offers an appropriate distribution without excessive pressure drop.

* * * * *